(12) United States Patent
Barwicz et al.

(10) Patent No.: US 9,360,635 B2
(45) Date of Patent: Jun. 7, 2016

(54) DUAL-POLYMER FIBER OPTIC INTERFACE WITH MELT-BOND ADHESIVE

(71) Applicants: International Business Machines Corporation, Armonk, NY (US); AFL Telecommunications LLC, East Duncan, SC (US)

(72) Inventors: Tymon Barwicz, Yorktown Heights, NY (US); Eddie Kimbrell, Dacula, GA (US); Ted Lichoulas, Simpsonville, SC (US)

(73) Assignees: INTERNATIONAL BUSINESS MACHINES CORPORATION, Armonk, NY (US); AFL TELECOMMUNICATIONS LLC, East Duncan, SC (US)

( * ) Notice: Subject to any disclaimer, the term of this patent is extended or adjusted under 35 U.S.C. 154(b) by 170 days.

(21) Appl. No.: 14/327,140

(22) Filed: Jul. 9, 2014

(65) Prior Publication Data

US 2016/0011373 A1    Jan. 14, 2016

(51) Int. Cl.
*G02B 6/36* (2006.01)
*G02B 6/38* (2006.01)

(52) U.S. Cl.
CPC ............ *G02B 6/3839* (2013.01); *G02B 6/3636* (2013.01); *G02B 6/3652* (2013.01); *G02B 6/3881* (2013.01)

(58) Field of Classification Search
None
See application file for complete search history.

(56) References Cited

U.S. PATENT DOCUMENTS

| | | | |
|---|---|---|---|
| 6,780,944 B1 | 8/2004 | Miura et al. | |
| 7,197,224 B2 | 3/2007 | Rolston et al. | |
| 7,223,025 B2 | 5/2007 | Benzoni et al. | |
| 7,616,852 B2 | 11/2009 | Ohtsu et al. | |
| 7,794,158 B2 | 9/2010 | Yasuda et al. | |
| 8,534,927 B1 | 9/2013 | Barwicz et al. | |
| 8,545,108 B1 | 10/2013 | Barwicz et al. | |
| 8,724,937 B2 | 5/2014 | Barwicz et al. | |
| 2005/0281518 A1* | 12/2005 | Tanaka | G02B 6/448 385/114 |
| 2010/0310214 A1 | 12/2010 | Miyadera et al. | |
| 2012/0275748 A1 | 11/2012 | Yamaguchi et al. | |
| 2013/0156365 A1 | 6/2013 | Barwicz et al. | |

(Continued)

OTHER PUBLICATIONS

List of IBM Patents or Patent Applications Treated as Related; Jul. 10, 2014; pp. 1-2.

(Continued)

*Primary Examiner* — Jerry Rahll
(74) *Attorney, Agent, or Firm* — Cantor Colburn LLP; Vazken Alexanian

(57) ABSTRACT

A fiber optic termination includes a homogeneous flexible body comprising a first polymer comprising a plurality of grooves defined therein, each groove configured to receive a corresponding filament of the fiber optic ribbon; each groove carrying a coating comprising a second polymer, each coating forming a melt-bond adhesive for attaching the associated groove to a first portion of a corresponding filament while leaving a second opposing portion of the corresponding filament and lateral side portions of the corresponding filament between the first and second portions substantially accessible for connection to a mating component; wherein the first polymer has a first melting point that is higher than a second melting point of the second polymer causing the second polymer to melt to bond the filaments to the grooves without melting the first polymer when the second polymer is heated to a temperature between the first and second melting points.

20 Claims, 8 Drawing Sheets

(56) References Cited

U.S. PATENT DOCUMENTS

2014/0177222 A1  6/2014  Barwicz et al.
2014/0179034 A1  6/2014  Barwicz et al.

OTHER PUBLICATIONS

Tymon Barwicz, et al., "Material Structures for Front-End of the Line Integration of Optical Polarization Splitters and Rotators," Related Application, U.S. Appl. No. 13/835,725, filed Mar. 15, 2013.

Tymon Barwicz, et al., "Material Structures for Front-End of the Line Integration of Optical Polarization Splitters and Rotators," Related Application, U.S. Appl. No. 13/971,390, filed Aug. 20, 2013.

Tymon Barwicz, et al., "Fiber Pigtail With Integrated Lid," Related Application, U.S. Appl. No. 13/804,269, filed Mar. 14, 2013.

Tymon Barwicz, et al., "Fiber Optic Interface With Adhesive Fill System," Related Application, U.S. Appl. No. 14/327,117, filed Jul. 9, 2014.

* cited by examiner

DUAL-POLYMER FIBER OPTIC INTERFACE WITH MELT-BOND ADHESIVE

BACKGROUND

The present invention relates generally to fiber optic communications and, more specifically, to a dual-polymer fiber optic interface for placement between a fiber optic ribbon and a mating component such as an optical waveguide, semiconductor die or terminal connector, and having a melt-bond adhesive for bonding the interface to exposed fiber of the ribbon.

Typically, electro-optic equipment needs to be terminated with a fiber optic connector in order to allow equipment to equipment connectivity. A fiber optic interface, also referred to a lid or stub, provides a means to terminate the electro-optic equipment with a terminated fiber. From a conventional view, a fiber optic interface is often placed at the end of a fiber ribbon or pigtail, which is typically a short, exposed length of optical fiber ribbon broken out from a larger fiber bundle. The pigtail is usually positioned adjacent to another piece of equipment requiring connection to the fiber pigtail. The interface physically attaches to first portions of the exposed optic filaments, while also attaching to, and placing second portions of the exposed filaments in contact with, a receiving piece of equipment to make a physical and optical connection between the pigtail and the receiving piece of equipment.

For example, a fiber optic interface may be used to physically and optically connect the fiber optic ribbon to a mating component such as a waveguide, semiconductor die, a terminal connector, etc. The fiber optic interface should meet a number of objectives, including providing a secure connection to the optical fibers, leaving a portion of the fibers exposed for connection to the mating component, making a secure connection with the mating component in view of conditions of the material, shape and rigidity of the receiving interface as wells as environmental conditions, such coefficients of thermal expansion, vibration, moisture, vapors, chemicals, and other aspects of the intended operating environment.

SUMMARY

In one embodiment, a fiber optic termination includes a homogeneous flexible body comprising a first polymer comprising a plurality of grooves defined therein, each groove configured to receive a corresponding filament of the fiber optic ribbon; each groove carrying a coating comprising a second polymer, each coating forming a melt-bond adhesive for attaching the associated groove to a first portion of a corresponding filament while leaving a second opposing portion of the corresponding filament and lateral side portions of the corresponding filament between the first and second portions substantially accessible for connection to a mating component; wherein the first polymer has a first melting point that is higher than a second melting point of the second polymer causing the second polymer to melt to bond the filaments to the grooves without melting the first polymer when the second polymer is heated to a temperature between the first and second melting points.

In another embodiment, a fiber optic termination includes an exposed length of fiber optic filaments and an interface. The interface includes a homogeneous flexible body comprising a first polymer comprising a plurality of grooves defined therein, each groove receiving a corresponding filament of the ribbon; each groove carrying a coating comprising a second polymer, each coating forming a melt-bond adhesive for attaching the associated groove to a first portion of a corresponding filament while leaving a second opposing portion of the corresponding filament and lateral side portions of the corresponding filament between the first and second portions substantially accessible for connection to a mating component; wherein the first polymer has a first melting point that is higher than a second melting point of the second polymer causing the second polymer to melt to bond the filaments to the grooves without melting the first polymer when the second polymer is heated to a temperature between the first and second melting points.

In another embodiment, a method for manufacturing a fiber optic termination includes forming an interface. The interface includes a homogeneous flexible body comprising a first polymer comprising a plurality of grooves defined therein, each groove configured to receive a corresponding filament of the ribbon; each groove carrying a coating comprising a second polymer, each coating forming a melt-bond adhesive for attaching the associated groove to a first portion of a corresponding filament while leaving a second opposing portion of the corresponding filament and lateral side portions of the corresponding filament between the first and second portions substantially accessible for connection to a mating component; wherein the first polymer has a first melting point that is higher than a second melting point of the second polymer. The method further includes placing the filaments on the grooves, heating the second polymer to a temperature between the first and second melting points to melt-bond the filaments to the grooves without melting the first polymer.

Additional features and advantages are realized through the techniques of the embodiments of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1A:
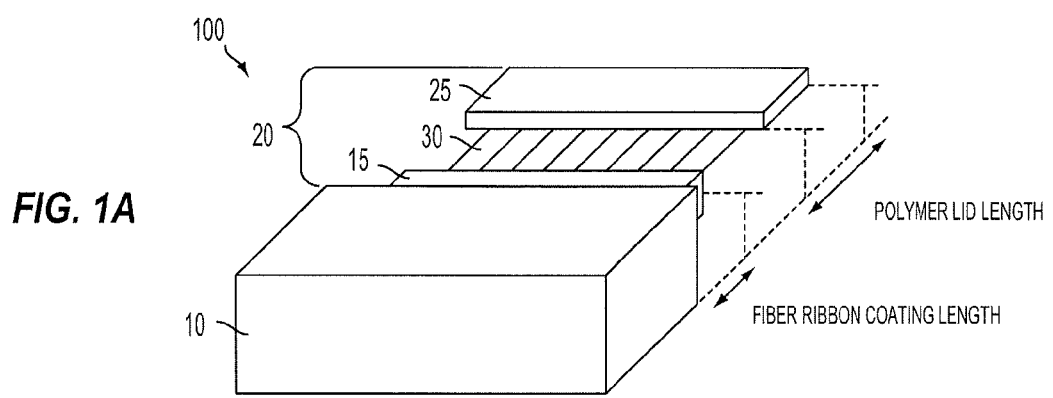
FIG. 1A is a perspective view of one type of pigtail connection utilizing a fiber optic interface.
Figure 1B:
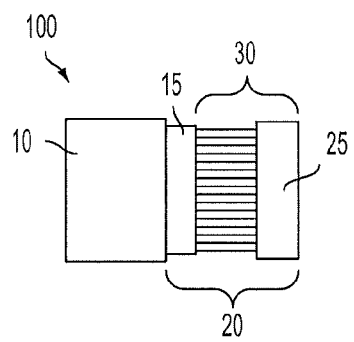
FIG. 1B is a top view of FIG. 1A.
Figure 1C:
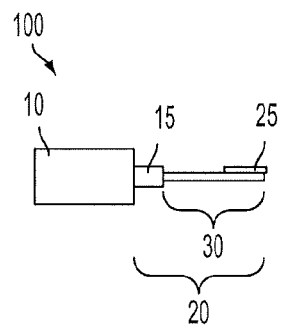
FIG. 1C is a side view of FIG. 1A.

Embodiments of the invention may be realized in a dual-polymer fiber optic interface configured for placement between a fiber optic ribbon and a mating component such as, for example, a waveguide, semiconductor die, or other terminal connector. The first polymer forms a flexible body while a second polymer with a lower melting point forms a melt-bond adhesive coating for adhering the interface to exposed filaments of a fiber optic ribbon. The body of the interface defines a number of grooves configured to receive filaments of the ribbon. Each groove is coated with a second polymer forming a melt-bond adhesive. The coating may be a separately molded liner, a co-molded liner, or a dispersion coating applied by vapor deposition, spraying, painting, powder coating, metered, or other suitable application technique. In an alternative embodiment, the entire exterior surface of the interface is coated with the melt-bond adhesive polymer. Each groove attaches to a first portion of a corresponding filament while leaving an opposing portion of the filament and lateral side portions of the filament between the first and second portions substantially accessible for connection to a mating interface. The first polymer forming the body has a higher melting point than the second polymer coating the grooves. When heated to a temperature between the melting points, the second polymer melts to adhere the filaments to the grooves without melting the first polymer forming the interface body.

The fiber optic interface is manufactured from a combination of flexible polymers that meet a number of objectives, including providing a secure connection to the optical fibers, leaving a portion of the fibers exposed for connection to a mating component, and flexing to adjust to the shape of a rigid mating component. The interface also demonstrates a number of properties producing a robust connection, such as desirable pliability, vibration tolerance, coefficient of thermal expansion (CTE), low moisture absorption, and chemical inertness. The interface may also provide connection points for a vacuum tool or connector used in mechanical assembly equipment. The interface may also provide optical fiducials for machine vision alignment.

Generally, fiber pigtails are known in the fiber optic industry and a variety of techniques have been used to assemble fibers to V-grooves and U-grooves defined on substrates. The assembly of a fiber pigtail to a substrate generally requires that a glass plate be applied on top of the fibers to maintain the fibers in the grooves while the adhesive cures. This approach usually requires the simultaneous use of two mechanical arms or fixtures, one to hold the fibers while the other pushes the glass plate down.

Mass producing fiber interfaces suitable for high speed data processing by traditional approaches is known to be labor intensive. Conventional synthetic materials and adhesives required to attach the fiber interfaces to semiconductor chips (also referred to as dies) mounted on printed circuit boards used in the Surface Mount Technology (SMT) manufacturing lines are becoming obsolete due to increased production temperatures associated with the adoption of the restrictions on hazardous substances (RoHS) initiative. UV transparent materials currently in use are not capable of handling the higher temperatures needed for ball-grid array soldering processes compliant with the RoHS initiative.

Conventional V-groove fiber assemblies use rigid materials that keep the fibers rigidly in place on a rigid interface substrate containing the abovementioned V-grooves. After the filaments have been adhered to the V-groove array, only a small portion of the bottom portions (under sides) of the filaments are exposed for mechanical connection to a mating component. Conventional V-groove structures, on the other hand, are sufficiently deep to substantially cover the lateral sides of the filaments.

Embodiments of the present invention provide a solution that reduces assembly times and improve manufacturing characteristics with materials and processes that can withstand the higher temperatures and processing speeds of modern SMT assembly lines. The fiber optic interface embodiments described in this disclosure provide a flexible lid with shallow U-grooves or flat bottomed V-grooves that leave most of the lateral sides of the filaments exposed for connection with a mating component. Improved softness of the lid-to-fiber assembly allows for later realignment of the fibers at assembly time when mated to a semiconductor die (for example) that typically includes a V-groove array.

Making the interface less rigid than conventional lids eases the challenge of dimensional matching of the V-groove pitch on the semiconductor die with the V-groove pitch of the lid. This challenge is usually complicated by unavoidable coefficient of thermal expansion (CTE) mismatch between the various materials. The present embodiments avoid this problem through a flexible interface that allows a rigid surface of the mating component to dictate the fine positions of the filaments. The flexible interface (lid) therefore acts as a coarse dimensional reference that maintains the fibers in a sufficiently accurate position for fine realignment dictated by the V-grooves on a rigid mating surface, such as a semiconductor die. The fiber optic interface also facilitates manufacturing through a unitary (homogeneous) body having integral grooves and adhesive fill features amenable to mass production by injection molding or hot embossing techniques. The adhesive melt features reduce assembly time and result in an improved part that is more robust than current designs while also exceeding SMT manufacturing processing temperatures and dwell times suitable for typical ball grid array (BGA) reflow processes with lead free (PbF) solder.

The interface includes a body formed of a first polymer and a second polymer with a lower melting point coating the grooves or, in an alternative embodiment, coating the entire body of the interface. For example, the interface body may be manufactured from a melt-process perfluoroalkoxy polymer (PFA) with a melting point of about 302° C. capable of maintaining mechanical integrity at continuous working temperatures of about 260° C. without performance degradation. The second polymer serving as the melt-bond adhesive may be a fluorinated ethylene propylene polymer (FEP) with a melting point of about 260° C. capable of maintaining mechanical integrity at continuous working temperatures of about 204° C. without performance degradation. The interface should demonstrate excellent visible, UV and optical transparency at desired wavelengths while being compatible with high temperature thermal and IR curable adhesives. Suitable materials may have UL-94-V0 rating as well as suitably low CTE and water absorption properties. The molded part should also be flexible and be substantially chemically inert.

One type of typical pigtail application of the fiber optic interface is shown in FIGS. 1A, 1B, 1C and 1D reproduced from commonly owned U.S. patent application Ser. No. 13/804,269 entitled "Fiber Pigtail with Integrated Lid" filed Mar. 13, 2013, which is incorporated by reference. In this reference, the fiber optic interface 25 is also referred to as the "lid" owing to its position on top of the fiber optic ribbon 20 in the pigtail arrangement. The fiber pigtail 100 includes a fiber optic ferrule 10 attached to one end of the ribbon 20, which includes a number of bare single-mode optical filaments 30, an optical fiber ribbon coating 15 surrounding part of the fiber optic ribbon 20, and an integrated polymer interface or lid 25 permanently attached to the other end of the fiber optic ribbon 20. As arranged in these figures, the fiber optic interface 25 is directly bonded to the upper portions (top sides) of the bare optic filaments 30 while exposing the bottom portions (under sides) and lateral sides of the filaments for connection with a mating component (FIG. 1D), such as a waveguide, semiconductor die, or terminal connector. Although the interface is well suited for use in this type of pigtail arrangement, it will be appreciated that the interface is not specific to this particular pigtail environment and may be used to terminate a fiber optic ribbon in other environments and applications.

Figure 1D:
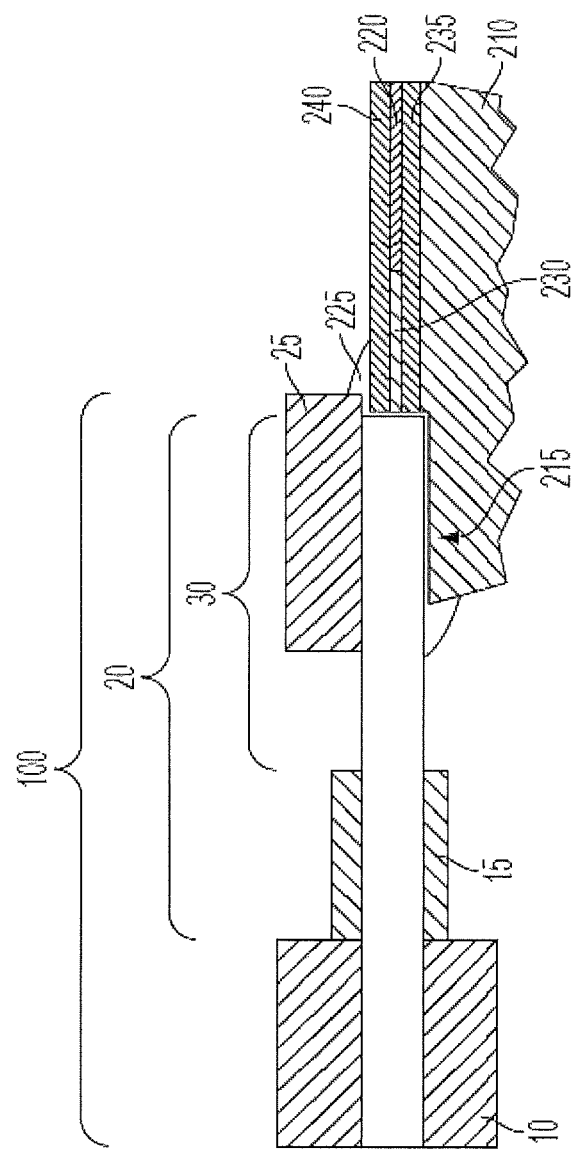
FIG. 1D illustrates a cross-sectional view of the fiber optic interface of FIG. 1A attached to an exemplary mating component.

The fiber pigtail 100 can be incorporated into any system and be attached to a circuit on a surface of a mating component such as a wafer or substrate, for example. FIG. 1D illustrates a cross-sectional view of the fiber pigtail 100 with integrated polymer lid 25 attached to an exemplary mating component 210. In the embodiment depicted, the mating component 210 includes a wafer that may be a diced segment of what is commonly understood as a wafer by one of ordinary skill in the art of semiconductor processing. The wafer 210 has a mechanical engagement feature 215 (e.g., a V-groove of V-groove array or a U-groove of a U-groove array) and a single-mode waveguide 220 in proximity to the bare fiber 30 end of the fiber pigtail 100 (an optionally in physical contact with end of bare fiber 30 near the cylindrical center of said fiber). Each mechanical engagement feature 215 is aligned to its own respective single-mode waveguide 220 to hold each single-mode optical bare fiber 30 in the correct position (i.e., correct predetermined spacing) for optical coupling between each single-mode bare fiber 30 and its respective single-mode waveguide 220. For example, there is an array of bare fibers 30 with each bare fiber 30 sitting in its own mechanical engagement feature 215 (i.e., each bare fiber 30 sits in its own V-groove), and the mechanical engagement features 215 are precisely aligned to their own individual single-mode waveguide 220 on the wafer 210. Accordingly, there is one groove per fiber, and an array of grooves on the wafer 210 matches an array of optical fibers 30. Accordingly, the fiber optic ribbon is a 1×N fiber optic ribbon 20, where N represents the number of individual fibers 30 in the array. A single-mode optical waveguide is a waveguide that can guide only one transverse electric mode and one transverse magnetic mode.

Glue 225 may be applied to hold the fiber pigtail 100 to the wafer 210. There is mechanical contact between a bare fiber 30 and its V-groove (which is the mechanical engagement feature 215) on the wafer 210, which can be held in place by the glue 225. Also, the tip of the bare fiber 30 is in proximity (below 100 µm and preferably (although not a necessity) below 10 µm) to its own single-mode waveguide 220. The single-mode waveguide 220 on the wafer 210 is shaped as or includes a mode size convertor, which is an optical mode converter 230, near the bare fiber 30 end of the fiber pigtail 100. Each single-mode waveguide 220 has its own optical mode converter 230. The optical mode in a single-mode bare fiber 30 may have a diameter of 3 to 15 µm and preferably 9 µm while the single-mode waveguide 220 may have a mode width or height between 0.2 µm and 2 µm and preferably close to 0.5 µm (although not a necessity). The optical mode converter 230 transitions the mode shape from the mode shape of a fiber (at the distal end of the mode converter that is in proximity to a fiber) to the mode shape of a single-mode waveguide 220, as understood by those skilled in the art.

The single-mode waveguide 220 on the wafer 210 is surrounded by a cladding material of refractive index similar to the fiber glass material of the bare fiber 30. The lower cladding 235 has a lower refractive index than the single-mode waveguide 220 (i.e., waveguide core). Upper cladding 240 has a refractive index that is lower than the single-mode waveguide 220. The upper cladding 240 may be optional.

Figure 2:
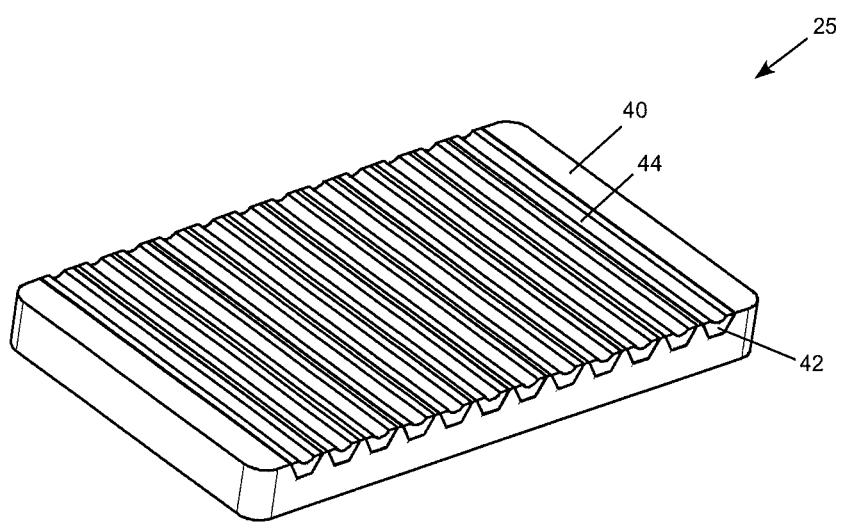
FIG. 2 is a perspective front view of a dual-polymer fiber optic interface with a melt-bond adhesive polymer positioned in grooves that receive fiber optic filaments in accordance with an embodiment of the invention.
Figure 3:
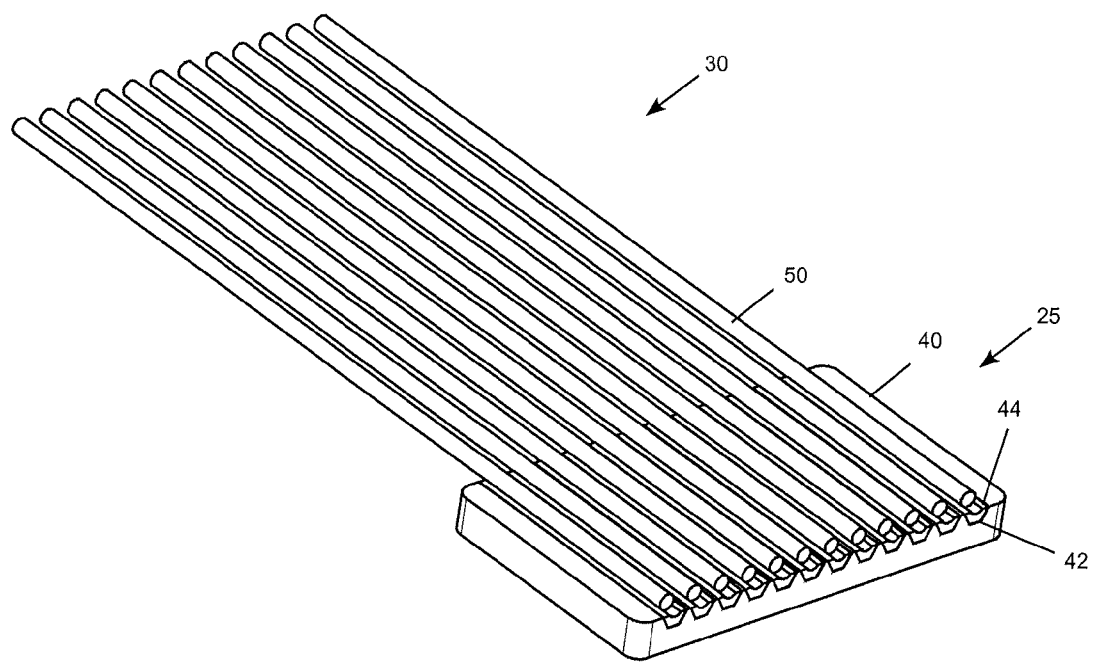
FIG. 3 is a perspective front view of the dual-polymer fiber optic interface with the fiber optic filaments positioned in the grooves of the interface in accordance with an embodiment of the invention.
Figure 4:
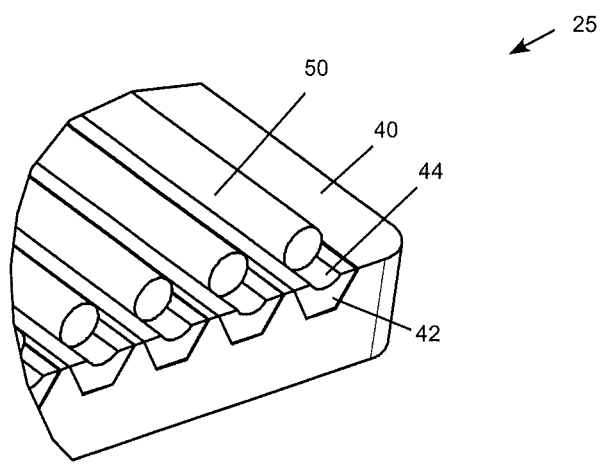
FIG. 4 is a perspective detail view showing fiber optic filaments positioned on the dual-polymer interface in accordance with an embodiment of the invention.

FIG. 2 is a perspective front view of a dual-polymer fiber optic interface 25 with a flexible body 40 with a number of shallow U-shaped or flat bottomed V-shaped grooves 42 that receive fiber optic filaments. FIG. 3 shows the interface 25 with the fiber optic filaments positioned in the grooves, while FIG. 4 shows an enlarged detail of the assembly. There are twelve grooves in this particular embodiment (only one set of grooves, coatings and filaments are enumerated to avoid cluttering the figure).

The grooves are coated with a melt-bond adhesive polymer, which in this example are configured as liners 44. The body 40 may be formed primarily of a first type of polymer, such as a PFA with a melting point around 302° C. The coatings in the grooves may be formed primarily of a second type of polymer, such as an FEP having a lower melting point of about 260° C. Shallow U-shaped or flat-bottomed V-shaped grooves are preferred over conventional V-shaped grooves that can pinch the filaments and/or block access to the lateral sides of the filaments by the mating component. The liners 44 can either be separately molded as an insert, or they may be co-molded in the same mold with the body using multi-shot technology. While the coatings in this embodiment are shown as separate liners 44 placed in the grooves 42, the coating may alternatively be dispersion applied onto the grooves, for example by vapor deposition, spraying, painting, power coating, dip coating or other suitable application technique.

Each groove 42 opens to one or more of vacuum ports 46 extending through the body 40 to allow the fiber to be held into position prior to or during bonding. The filament 30 could be positioned slightly inward from the edge of the body leaving an overhang to protect the end of the filament from damage and stray light. A suitable overhang should be at least 100 microns, but not so large as to leave the port uncovered by the filament. The interface should be annealed to relieve stress prior to bonding to an optical ribbon. The exterior surface of the fibers and/or of the interface may also be plasma treated to improve bonding properties.

The dual-polymer configuration does not require an additional adhesive component to bond the fibers to the grooves of the interface. Instead, the FEP polymer coating the grooves (the liners 44 in this embodiment) are heated to the melting point using a suitably targeted heating process, such as a localized IR spot lamp, laser heating, or thermal compression bonding. The heat source melts the FEP resin forming the groove coating causing the polymer to become molten and flow around the glass fibers. The heat source is removed before the melting point of the PFA resin forming the body 40 is reached. The molten FEP polymer then solidifies forming and adhesive bonding the fibers to the grooves.

During the assembly process, a clamping plate fixture provides uniform downward pressure on the fibers to force the fibers to make contact with the side walls of the grooves. This ensures lateral alignment of the fiber during the melt bond process. This also ensures that the molten FEP polymer remains in contact with all available surfaces of the fiber, which makes the bond line less susceptible to delamination due to thermal cycling and moisture absorption during assembly of the interface to surface of the mating component and during the subsequent product life.

Figures 5, 6:
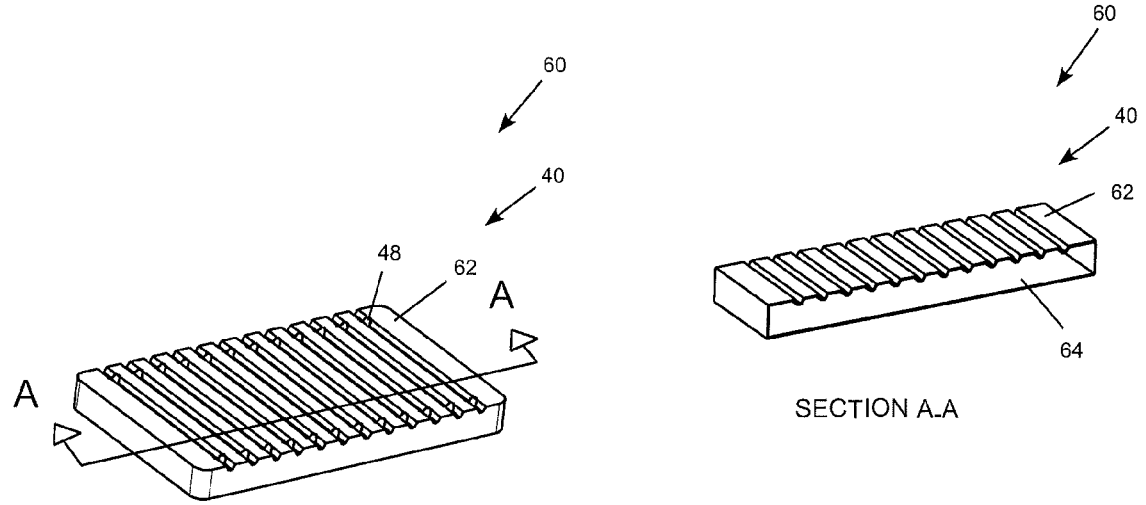
FIG. 5 is a perspective front view of an alternative dual-polymer interface in which the melt-bond adhesive polymer coats the entire body of the interface in accordance with an embodiment of the invention.
FIG. 6 is a section view of the alternative dual-polymer fiber optic interface in accordance with an embodiment of the invention.

FIG. 5 is a perspective front view and FIG. 6 is a section view of an alternative dual-polymer interface 60 in which the melt-bond adhesive FEP polymer coating 62 covers the entire PFA polymer body 64 of the interface. Covering the entire core 64 with the coating 62 facilitates dispersion application of the coating, such as spray or vapor deposition. Dipping, painting, powder coating and other coating processes may also be utilized. The coating may alternatively be applied only to a portion of the body, such as the front side with the grooves. Masking may also be used to apply the coating only to the area of the grooves.

Figure 7:
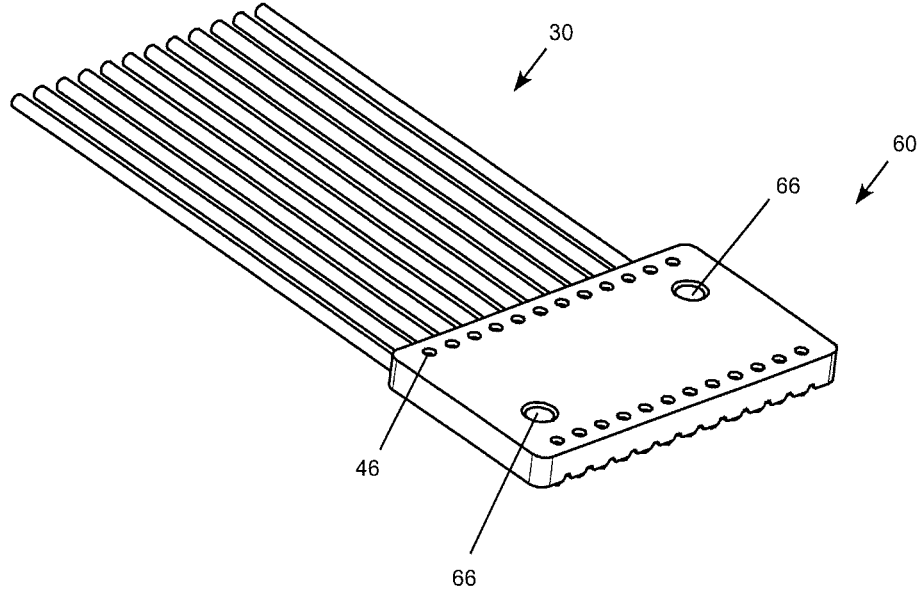
FIG. 7 is a perspective rear view of the fiber optic interface attached to an optical ribbon in accordance with an embodiment of the invention.

FIG. 7 is a perspective view of the interface showing the rear side of the interface 60 and the placement of the fiber optic filaments 50 on the interface. In this particular embodiment, vacuum pickups 66 are provided to assist a vacuum tool in picking up the interface. The vacuum tool may be used, for example, to move the interface off an assembly jig after the melt-bond adhesive has been melted.

Figure 8:
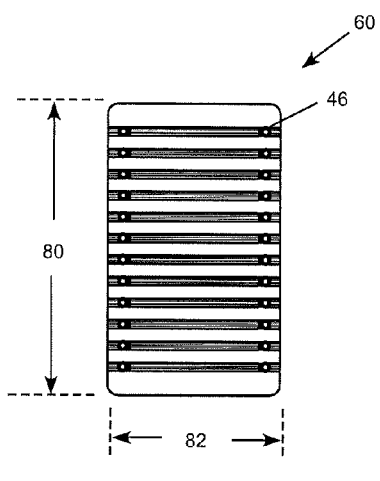
FIG. 8 is a front view of the dual-polymer fiber optic interface showing exemplary dimensions in accordance with an embodiment of the invention.
Figure 9:
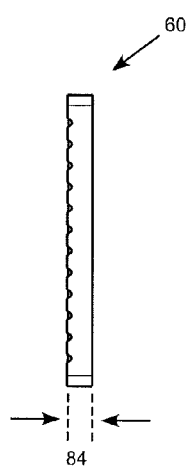
FIG. 9 is a side view of the dual-polymer fiber optic interface showing exemplary dimensions in accordance with an embodiment of the invention.
Figure 10:
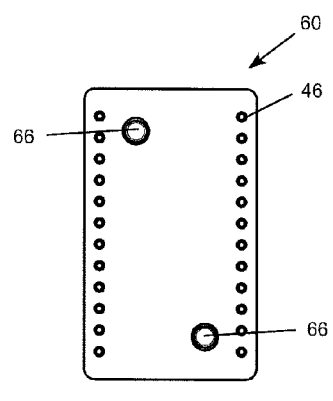
FIG. 10 is a rear view of the dual-polymer fiber optic interface showing exemplary locations for tool connection in accordance with an embodiment of the invention.

FIG. 8 is a front view of the fiber optic interface 60 showing exemplary dimensions of an illustrative embodiment shown generally to scale. This particular interface body has a length 80 transverse to the filaments of 3.8 mm and a width 82 parallel to the filaments of 2.0 mm. The side view of FIG. 9 shows that the body has a thickness 84 of 0.3 mm. The vacuum port 46 may be in the range of about 10 to 300 microns (μm) in diameter, such as 60 μm in diameter. The rear view of FIG. 10 shows the relative size and placement of the tooling holes 66 in this particular model.

Examples of material properties of suitable materials for the interface body and coating are summarized in Table A. It will be appreciated that other materials may be used as well.

TABLE A

| Resin | Body - PFA | Coating - FEP |
|---|---|---|
| Continuous Working Temp | 260° C. | 204° C. |
| Short Term Working Temp | 280° C. | 250° C. |
| Transmission in Visible Spectrum | 90% in 400-700 nm | 75-80% 350-400 nm |
| Transmission in UV Spectrum | 70-90% 350-400 nm | 75-80% 350-400 nm |
| Melting Point | 302-310° C. | 260-280° C. |

The interface should also maintain adhesion to the fibers and structural integrity despite contact with common solvents such as methanol, acetone, ethanol and ketones, esters, and ethers. It should also be sufficiently flexible to conform to common semiconductor dies by showing significantly smaller modulus than the semiconductor die. For example, the Young's modulus should be below 5 GPa and preferably below 2.4 GPa or 1 GPa. Suitable PFAs have a Flexural Modulus at 23° C. of 695 MPa, and suitable FEPs have a Flexural Modulus at 23° C. of 625 MPa. In general, the interface should be relatively soft at room at 23° C. so that it flexes easily but does not break when pressed against a semiconductor die. In addition, the interface should be amenable to heat molding above the unannealed 66 psi heat deflection temperature and hold for a sufficiently to avoid significant warping when the part is used at higher temperatures.

During assembly of the fiber to the interface, a force of between 0.1 to 10 Newtons (N) and typically in the range of 0.5 to 2 N (about one Newton has been found suitable) is used on top of the fibers for the purpose of forcing the fibers into the adhesive in order to maintain dimensional requirements of lid-to-fiber interface. That is, the body of the interface is sufficiently flexible to bend but not break when a force of about one Newton is applied to urge the filaments into the grooves. The clamp plate may be IR or laser transparent, such as a piece of glass/other since the line of sight for the heating source is typically positioned directly above the polymer lid.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A fiber optic interface for a fiber optic ribbon, comprising:
   a homogeneous flexible body comprising a first polymer comprising a plurality of grooves defined therein, each groove configured to receive a corresponding filament of the fiber optic ribbon;
   each groove carrying a coating comprising a second polymer, each coating forming a melt-bond adhesive for attaching the associated groove to a first portion of a corresponding filament while leaving a second opposing portion of the corresponding filament and lateral side portions of the corresponding filament between the first and second portions substantially accessible for connection to a mating component;
   wherein the first polymer has a first melting point that is higher than a second melting point of the second polymer causing the second polymer to melt to bond the filaments to the grooves without melting the first polymer when the second polymer is heated to a temperature between the first and second melting points.

2. The fiber optic interface of claim 1, further comprising a plurality of vacuum ports in the body.

3. The fiber optic interface of claim 2, wherein the interface comprises two vacuum ports for each groove.

4. The fiber optic interface of claim 1, wherein the mating component is rigid, and the body is sufficiently flexible to permit realignment of the fibers to accommodate connection to the mating component.

5. The fiber optic interface of claim 1, wherein the body is sufficiently flexible to bend but not break when a force of about one Newton is applied to urge the filaments into the grooves with melt-bond adhesive located in the grooves.

6. The fiber optic interface of claim 1, wherein the first polymer is a perfluoroalkoxy polymer (PFA) having a melting point of about 302° C. and the second polymer is a fluorinated ethylene propylene polymer (FEP) having a melting point of about 260° C.

7. The fiber optic interface of claim 6, wherein the first polymer has a continuous working temperature of at least 260° C., and the second polymer has a continuous working temperature of at least 204° C.

8. The fiber optic interface of claim 7, wherein the second polymer covers the entire body of the interface.

9. The fiber optic interface of claim 7, wherein the second polymer covers an entire side of the body of the interface where the grooves are located.

10. The fiber optic interface of claim 1, wherein the body demonstrates an optical spectrum transmission of 70-90% in the range of 350-400 nm.

11. A fiber optic termination, comprising:
   an exposed length of fiber optic filaments; and
   an interface, comprising:
      a homogeneous flexible body comprising a first polymer comprising a plurality of grooves defined therein, each groove receiving a corresponding filament of the ribbon;
      each groove carrying a coating comprising a second polymer, each coating forming a melt-bond adhesive for attaching the associated groove to a first portion of a corresponding filament while leaving a second opposing portion of the corresponding filament and lateral side portions of the corresponding filament between the first and second portions substantially accessible for connection to a mating component;
      wherein the first polymer has a first melting point that is higher than a second melting point of the second polymer causing the second polymer to melt to bond the filaments to the grooves without melting the first polymer when the second polymer is heated to a temperature between the first and second melting points.

12. The fiber optic termination of claim 11, further comprising optical fiducials for machine vision alignment.

13. The fiber optic termination of claim 12, wherein the interface comprises at least one vacuum port for each groove.

14. The fiber optic termination of claim 11, wherein the body is sufficiently flexible to permit realignment of the fibers to accommodate connection to the mating component.

15. The fiber optic termination of claim 11, wherein the body is sufficiently flexible to bend but not break when a force of about one Newton is applied to urge the filaments into the grooves with adhesive located in the grooves.

16. The fiber optic termination of claim 11, wherein the first polymer is a perfluoroalkoxy polymer (PFA) having a melting point of about 302° C. and the second polymer is a fluorinated ethylene propylene polymer (FEP) having a melting point of about 260° C.

17. A method for manufacturing a fiber optic termination, comprising:
   forming an interface comprising:
      a homogeneous flexible body comprising a first polymer comprising a plurality of grooves defined therein, each groove configured to receive a corresponding filament of the ribbon;
      each groove carrying a coating comprising a second polymer, each coating forming a melt-bond adhesive for attaching the associated groove to a first portion of a corresponding filament while leaving a second opposing portion of the corresponding filament and lateral side portions of the corresponding filament between the first and second portions substantially accessible for connection to a mating component;
      wherein the first polymer has a first melting point that is higher than a second melting point of the second polymer;
   placing the filaments on the grooves;
   heating the second polymer to a temperature between the first and second melting points to melt-bond the filaments to the grooves without melting the first polymer.

18. The method of claim 17, further comprising:
   providing each groove with one or more vacuum ports; and
   providing optical fiducials for machine vision alignment.

19. The method of claim 17, further comprising covering the body with the second polymer.

20. The method of claim 17, wherein the first and second polymers demonstrate optical spectrum transmission of at least 70% in the range of 350-400 nm, and heating the second polymer comprises heating with an infrared (IR) source.

* * * * *